(12) United States Patent
Kwon et al.

(10) Patent No.: US 11,016,201 B2
(45) Date of Patent: May 25, 2021

(54) RADIATION MEASURING DEVICE

(71) Applicant: ISQUARE INC., Anseong-si (KR)

(72) Inventors: Ji Sung Kwon, Anseong-si (KR); Jung Ho Hwang, Anseong-si (KR)

(73) Assignee: ISQUARE INC., Anseong-si (KR)

( * ) Notice: Subject to any disclaimer, the term of this patent is extended or adjusted under 35 U.S.C. 154(b) by 0 days.

(21) Appl. No.: 16/650,542

(22) PCT Filed: Dec. 12, 2018

(86) PCT No.: PCT/KR2018/015777
§ 371 (c)(1),
(2) Date: Mar. 25, 2020

(87) PCT Pub. No.: WO2019/208900
PCT Pub. Date: Oct. 31, 2019

(65) Prior Publication Data
US 2020/0278457 A1    Sep. 3, 2020

(30) Foreign Application Priority Data

Apr. 27, 2018 (KR) .......................... 10-2018-0049090
Jun. 22, 2018 (KR) .......................... 10-2018-0071868

(51) Int. Cl.
*G01T 1/178* (2006.01)
*G01T 1/185* (2006.01)

(52) U.S. Cl.
CPC .............. *G01T 1/178* (2013.01); *G01T 1/185* (2013.01)

(58) Field of Classification Search
CPC ................................ G01T 1/178; G01T 1/185
See application file for complete search history.

(56) References Cited

U.S. PATENT DOCUMENTS 4,286,160 A      8/1981  Ried, Jr.
7,312,439 B1 *  12/2007  Kotrappa .................. G01T 1/14
                                                            250/255

FOREIGN PATENT DOCUMENTS

| JP | 57-028275 A | 2/1982 | |
| JP | 09-507568 A | 7/1997 | |
| JP | 2016-095245 A | 5/2016 | |
| KR | 10-2008-0031547 A | 4/2008 | |
| KR | 101226735 B1 * | 1/2013 | ............. G01T 1/167 |

* cited by examiner

*Primary Examiner* — David P Porta
*Assistant Examiner* — Fani Boosalis
(74) *Attorney, Agent, or Firm* — Novick, Kim & Lee, PLLC; Jae Yoon Kim

(57) ABSTRACT

Disclosed is a radiation measuring device capable of measuring concentration of radiation contained in indoor air. The radiation measuring device according to the present invention includes: an ionization chamber configured to be supplied with a voltage and to form a space for ionizing air introduced; a substrate assembly coupled to the ionization chamber and transfer the voltage supplied from the outside to the ionization chamber; a probe member provided in the ionization chamber and configured to detect an electric charge in the ionization chamber; and a switching element connected to the probe member and configured to allow a current to flow when the electric charge is applied to the probe member.

9 Claims, 6 Drawing Sheets

RADIATION MEASURING DEVICE

TECHNICAL FIELD

The present invention relates to a radiation measuring device, and more particularly, to a radiation measuring device capable of measuring concentration of radioactive substances contained in indoor air.

BACKGROUND ART

With the rapid industrialization, problems related to indoor air quality have emerged. In order to improve the air quality, air cleaners are used in ordinary homes, and air conditioners are used in public facilities used by many people. The air cleaner or air conditioner is equipped with a plurality of filters, and the filters filter out suspended substances, harmful substances, or dust present in the air.

Meanwhile, radon is a naturally occurring radioactive isotope and is formed by the natural decay of uranium and thorium present in rocks, soil, air, and water.

The most common form of radioactive isotopes is radon-222 (222Rn). Here, radon is converted into polonium-218 (218Po), which is a radon progeny, by emitting alpha particles. Polonium-218 (218Po) may easily adhere to fine dust or particles and move into the air, and Polonium-218 (218Po) enters the human body via the respiratory tract and adheres to the lung. Radon, which adheres to the lungs, causes lung cancer by destroying lung basal cells while continuously emitting alpha rays toward the lung.

Therefore, in order to prevent lung cancer caused by radon, it is necessary to manage concentration of indoor radon below a reference value.

Of course, the most amount of radon is easily diluted in well-ventilated spaces, such that radon does not affect the human body. However, recently, a degree of sealing buildings is increased in order to increase energy efficiency, building materials, which emit a large amount of radon, are frequently used, and a ventilation rate is lowered, as a result of which a phenomenon in which radon is concentrated indoors becomes severe. For this reason, 95% of the amount of radon is introduced into the human body by respiration in the indoor space, and the human body is exposed to radon. For reference, radon accounts for about 50% of natural radiation to which people are usually exposed.

In addition, radon has a short half-life of 3.82 days, which is the time it takes for the number of atoms to decrease by half, but high-concentration radioactive rays are emitted during the short period of time.

Accordingly, recently, various methods used to reduce concentration of radon contained in indoor air.

First, the concentration of radon contained in the indoor air is reduced by directly opening windows to ventilate rooms. However, if the room is frequently ventilated in order to lower the concentration of radon in the room, there is a problem in that a loss of cooling and heating efficiency occurs and external pollutants such as yellow dust and fine dust may be introduced into the room.

In addition, a mechanical ventilation system is installed in the house in order to periodically supply fresh air and discharge indoor air, thereby reducing the concentration of radon in indoor air. However, there are problems in that it is very expensive to install the mechanical ventilation system, the cost required to maintain the mechanical ventilation system is very high, and noise occurs.

For example, Korean Patent Application Laid-Open No. 10-2017-0023599 (entitled Alpha Particle Detecting Device Using Differential Amplifier and Ionization Chamber Having Dual Probe Structure) includes an ionization chamber configured to form an electric field therein by applying bias power to a surface, a main probe unit disposed in the ionization chamber and configured to absorb ion charges produced in the ionization chamber, a guide ring unit penetrated by the main probe unit toward the inside of the ionization chamber and configured to absorb a leakage current generated between the ionization chamber and a main support unit, an auxiliary probe unit configured to penetrate the inside of the guide ring unit and disposed in the ionization chamber to allow peripheral noise to be introduced thereinto, first and second pre-amplifiers connected to the main probe unit and the auxiliary probe unit and configured to amplify fine electrical signals inputted from the main probe unit and the auxiliary probe unit, and a differential amplifier connected to output terminals of the first and second pre-amplifiers and configured to cancel out noise signals that amplify a difference in voltage between the amplified electrical signals, the differential amplifier being configured to output an alpha particle detection signal. The device in the related art is advantageous in that alpha particles may be detected with high sensitivity and low noise by effectively cancelling out electrical noise signals introduced from the outside, the device is small in size and easy to move, and the device may be manufactured at low cost.

However, the device in the related art uses a BNC connector disposed in the auxiliary probe unit, and the BNC connector is too high in unit price to be used for a small-sized measuring device, which causes a problem of an increase in costs required to manufacture the ionization chamber. Further, there is a problem in that the device in the related art has a complicated structure because the device includes the ionization chamber, the main probe unit, the auxiliary probe unit, the first and second pre-amplifiers, and the differential amplifier.

In particular, because the first and second pre-amplifiers and the differential amplifier are positioned outside the ionization chamber, noise caused by external signals and the like is increased, which makes it difficult to accurately measure numerical values of radiation. For this reason, there is a problem in that a separate shielding process needs to be performed.

DISCLOSURE

Technical Problem

An object of the present invention is to provide a radiation measuring device that may be manufactured at a significantly reduced cost and implemented more compactly with a simple structure because the radiation measuring device does not separately require an insulator or a BNC connector.

Another object of the present invention is to provide a radiation measuring device in which a switching element and a probe member are positioned in an ionization chamber, such that an influence of external noise may be minimized, thereby improving reliability of measurement results.

Technical problems to be solved by the present invention are not limited to the above-mentioned technical problems, and other technical problems, which are not mentioned above, may be clearly understood by those skilled in the art from the following descriptions.

Technical Solution

The above-mentioned objects can be achieved by a radiation measuring device according to the present invention including: an ionization chamber configured to be supplied with a voltage and to form a space for ionizing air introduced into the ionization chamber; a substrate assembly coupled to the ionization chamber and transfer the voltage supplied from the outside to the ionization chamber; a probe member provided in the ionization chamber and configured to detect an electric charge in the ionization chamber; and a switching element connected to the probe member and configured to allow a current to flow when the electric charge is applied to the probe member.

The switching element may be disposed in the ionization chamber and mounted on the substrate assembly.

The substrate assembly may include: a first substrate disposed in the ionization chamber and having the probe member to mounted on the first substrate; and a cover member configured to support the first substrate and coupled to the ionization chamber.

At least a part of the cover member may be made of a conductive material, and the part made of the conductive material may be in contact with the ionization chamber so as to transfer a voltage, supplied from the outside, to the ionization chamber.

The ionization chamber may have a stepped portion therein, and the cover member may be disposed such that an edge of one surface of the cover member is in contact with the stepped portion.

An insulation pad may be interposed between the first substrate and the cover member.

The substrate assembly may further include a second substrate disposed opposite to the first substrate with the cover member interposed therebetween, and the second substrate may apply the voltage, supplied from the outside, to the ionization chamber through the cover member.

The switching element may further include a connecting cable mounted on the first substrate in the ionization chamber, and the connecting cable electrically connects the second substrate and the switching element mounted on the first substrate.

At least one through hole may be formed in the cover member, one end of the connecting cable may be connected to the first substrate, and the other end of the connecting cable may penetrate the through hole and may be connected to the second substrate.

The cover member and the second substrate may be coupled to each other by a conductive fastening member, and a circuit pattern, which transfers a voltage, supplied from the outside, to the cover member through the fastening member, may be formed on the second substrate.

Advantageous Effects

According to the radiation measuring device according to the present invention, reliability of results of measuring radiation may be improved by minimizing an influence of external noise, costs required to manufacture the radiation measuring device may be significantly reduced because the radiation measuring device does not separately require an insulator or a BNC connector, and the radiation measuring device may be more compactly implemented because the radiation measuring device has a simple structure.

BEST MODE

Figure 1:
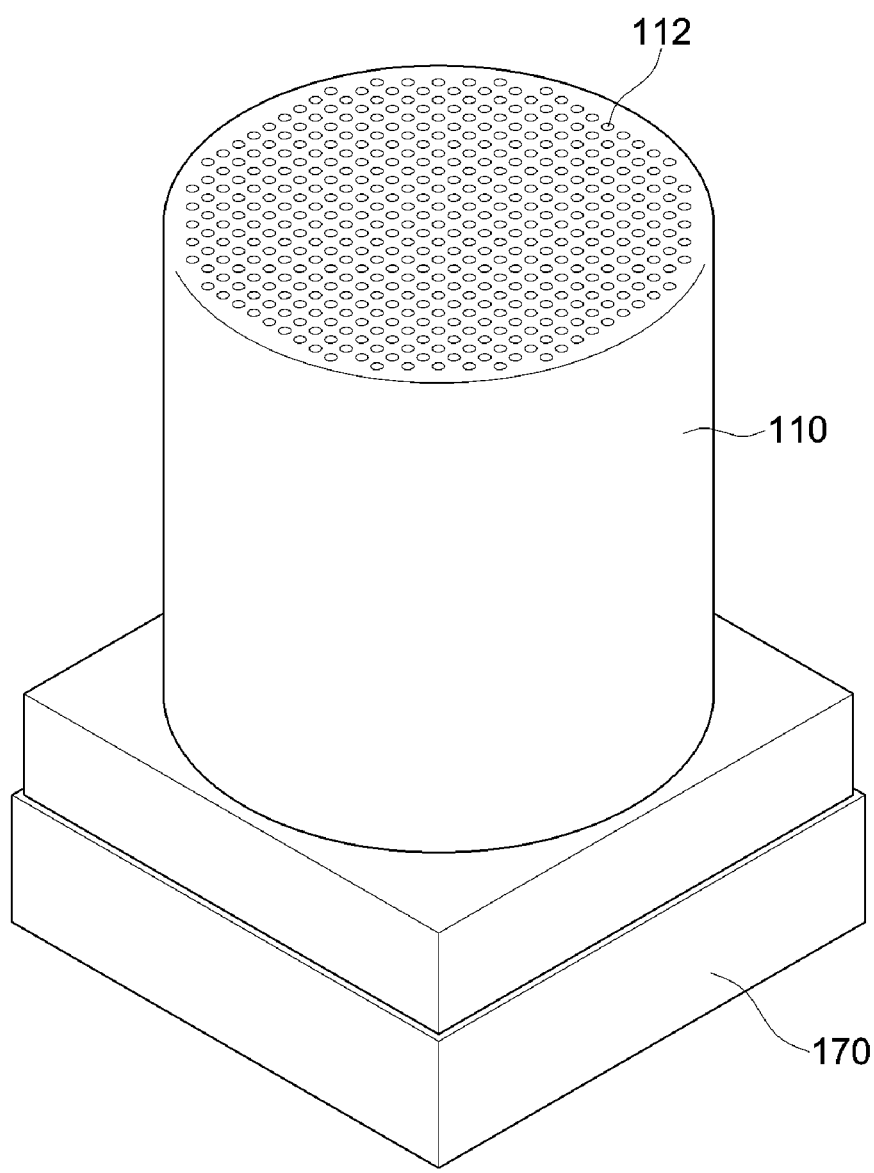
FIG. 1 is a perspective view of a radiation measuring device according to one exemplary embodiment of the present invention.

Hereinafter, exemplary embodiments of the present invention will be described in detail with reference to the accompanying drawings so that those skilled in the technical field to which the present invention pertains may easily carry out the exemplary embodiment. The present invention may be implemented in various different ways and is not limited to the exemplary embodiments described herein.

It is noted that the drawings are schematic and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Exemplary embodiments of the present disclosure illustrate ideal exemplary embodiments of the present disclosure in detail. As a result, various modifications of the drawings are expected. Therefore, the exemplary embodiments are not limited to specific forms in regions illustrated in the drawings, and for example, include modifications of forms by the manufacture thereof.

Hereinafter, a radiation measuring device 100 according to an exemplary embodiment of the present invention will be described with reference to the accompanying drawings.

For reference, among various radioactive substances that may be contained in the air, radon accounts for about 50% of the annual natural radiation dose, among radiation doses, and is exposed to a human body. The radiation measuring device 100 according to the exemplary embodiment of the present invention serves to measure concentration of radon by using an ionization chamber. For this reason, the radioactive substance to be measured is limited to radon in the following description, but the present invention is not necessarily limited thereto.

Referring to FIGS. 1 to 6, the radiation measuring device 100 according to the exemplary embodiment of the present invention includes an ionization chamber 110 having a space configured to allow air to be introduced thereinto and configured to ionize the introduced air by means of an applied voltage, a substrate assembly 120 coupled to the ionization chamber 110 and configured to transfer the voltage, supplied from the outside, to the ionization chamber 110, a probe member 130 provided in the ionization chamber 110 and configured to detect electric charges in the ionization chamber, and a switching element 140 connected to the probe member 130 and configured to allow a current to flow when the electric charge is applied to the probe member 130.

Referring to FIGS. 1 to 4, outside air is introduced into the ionization chamber 110, and the ionization chamber 110 provides the space in which the introduced air is ionized by using the applied power. As described above, the ionization chamber 110 provides the space in which an electric field is formed, and the introduced air is ionized by using the applied power. Therefore, the ionization chamber 110 may be made of a conductive material. For example, the ionization chamber 110 according to the exemplary embodiment of the present invention may be made of a plastic material and then plated with nickel or chromium so as to have conductivity.

In this case, a bias voltage (+) is applied to the ionization chamber 110. In this case, since the ionization chamber 110 is made of a conductive material as described above, the electric field is formed in the ionization chamber 110. For reference, ion charges generated in the ionization chamber 110 by the alpha (a) decay are transmitted to a separate device positioned outside the ionization chamber 110.

In addition, the ionization chamber 110 is formed in a cylindrical shape, closed at one side, and opened at the other side. In this case, a plurality of air inlet holes 112 is formed at one closed side in order to enable air to be introduced into the ionization chamber 110.

In this case, the ionization chamber 110 is formed in a cylindrical shape, closed at one side, and opened at the other side as described above, and a stepped portion 114 is formed at the other opened side. The substrate assembly 120 to be described below is coupled to the stepped portion 114. In other words, the stepped portion 114 formed at a lower end of the ionization chamber 110 makes it easy to couple the substrate assembly 120 to the ionization chamber 110.

Figure 2:
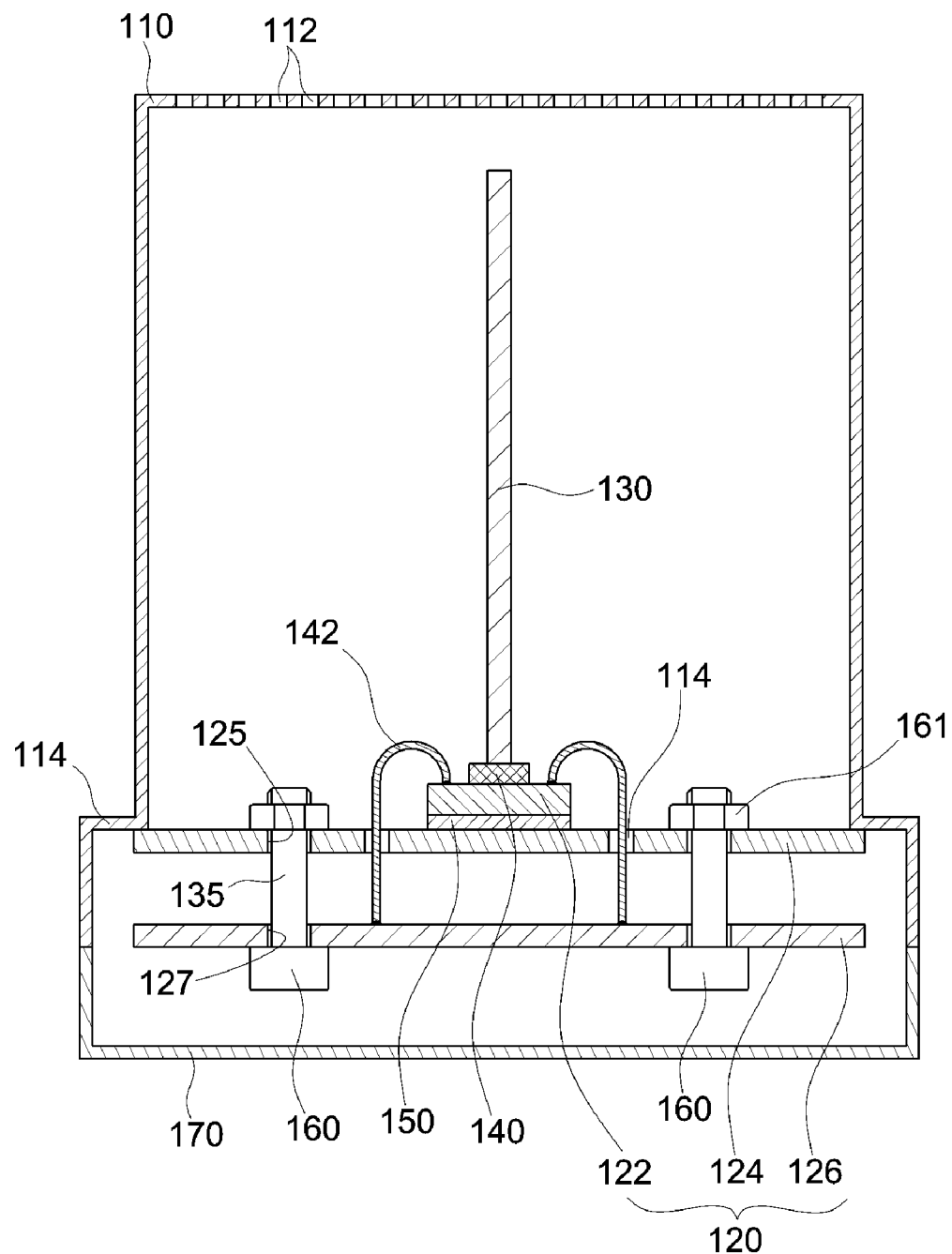
FIG. 2 is a cross-sectional view of the radiation measuring device illustrated in FIG. 1.
Figure 3:
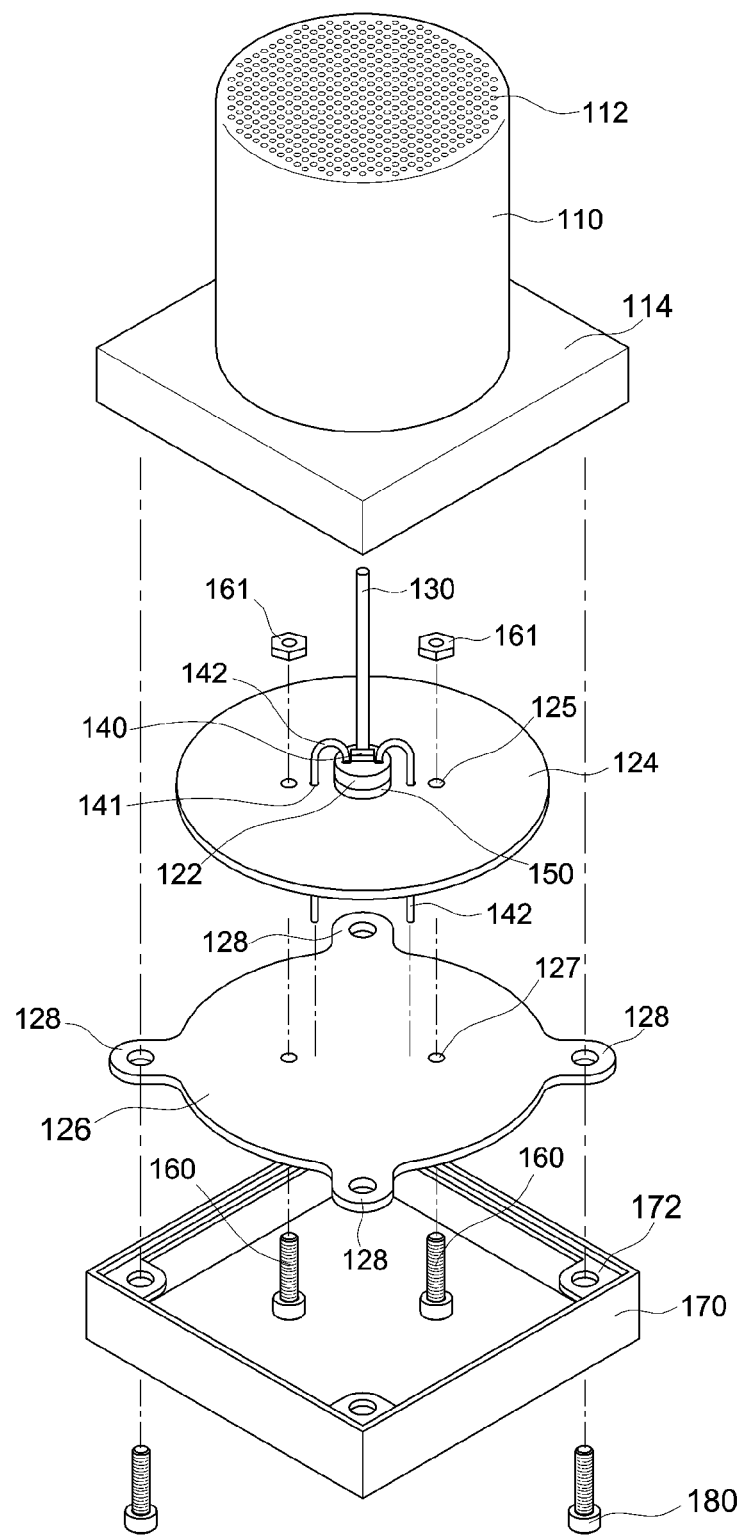
FIG. 3 is an exploded perspective view of the radiation measuring device illustrated in FIG. 2.
Figure 5:
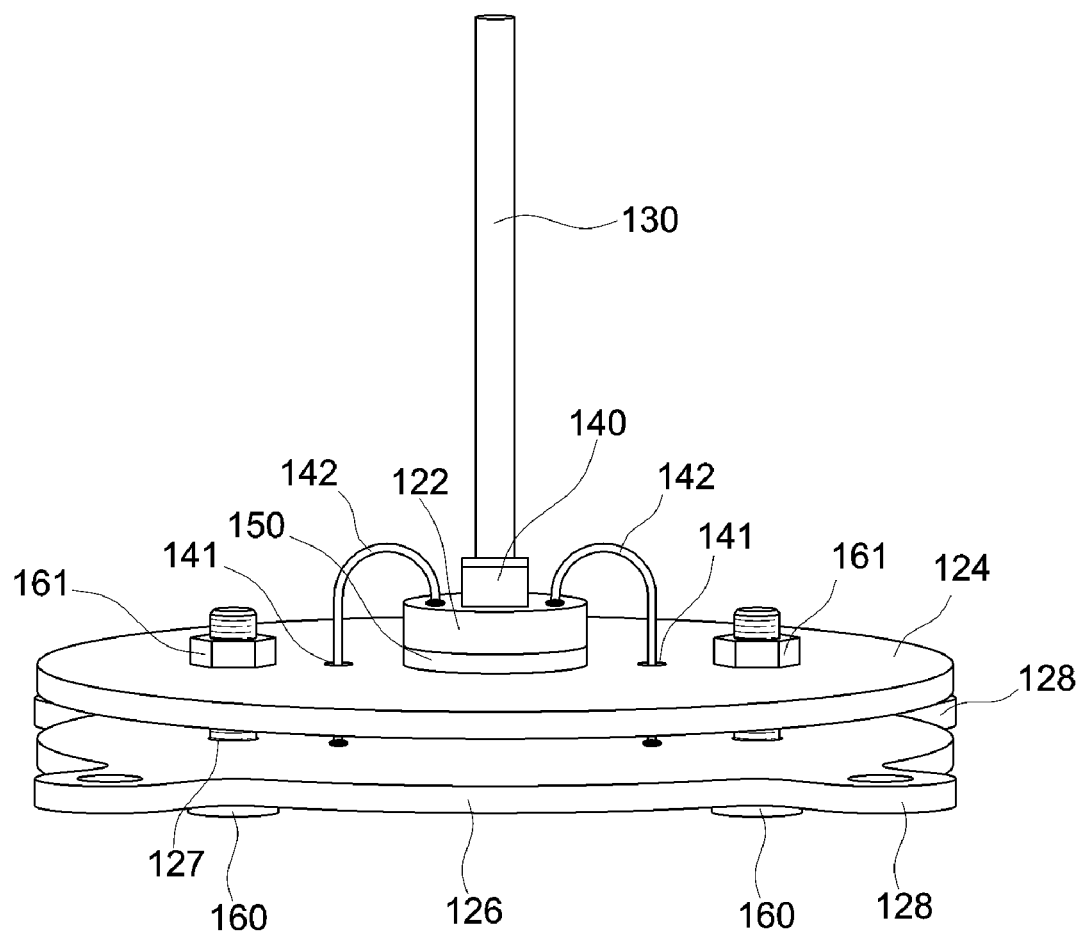
FIG. 5 is a perspective view of a substrate assembly illustrated in FIGS. 2 and 3.

Referring to FIGS. 2, 3, and 5, the substrate assembly 120 is coupled to the ionization chamber 110, and transfers the voltage, supplied from the outside, to the ionization chamber 110. As described above, the substrate assembly 120 is coupled to the other opened side of the ionization chamber 110, that is, to the stepped portion 114 formed at the lower end of the ionization chamber 110 and closes the other opened side of the ionization chamber 110.

The substrate assembly 120 includes a first substrate 122, a cover member 124, and a second substrate 126.

The probe member 130 and the switching element 140, which will be described below, are mounted on the first substrate 122. Therefore, the first substrate 122 may be formed as a patterned PCB substrate. In other words, the first substrate is patterned in advance in order to electrically connect respective components, and the switching element 140 and the probe member 130 are mounted on the patterned portion and electrically connected to the patterned portion. In this case, because the probe member 130 and the switching element 140 mounted on the first substrate 122 are not very large in size, the first substrate 122 may have a smaller diameter than the cover member 124 and the second substrate 126 which will be described below. For reference, the first substrate 122 may have various shapes such as a circular or quadrangular shape.

The cover member 124 is coupled to the ionization chamber 110 so as to cover the other opened side of the ionization chamber 110. In this case, the cover member 124 serves as a conductive layer that transfers the voltage, supplied from the second substrate 126, to the ionization chamber 110. Therefore, at least one surface of the cover member 124 may be made of a conductive material, and the portion made of the conductive material may be in contact with the ionization chamber 110. For example, at least one surface, that is, any one of upper and lower end surfaces of the cover member 124 according to the exemplary embodiment of the present invention may be made of a plastic material and then plated with a conductive material so as to have conductivity, and an edge of one plated surface may be in contact with the stepped portion 114 of the ionization chamber 110.

Meanwhile, an insulation pad 150 is interposed between the first substrate 122 and the cover member 124. The insulation pad 150 serves to prevent noise from being generated between the first substrate 122 and the cover member 124, and thus the insulation pad 150 may be made of a non-conductive material.

Specifically, since both the first substrate 122 and the cover member 124 are made of conductive materials, noise inevitably occurs when the first substrate 122 and the cover member 124 are in direct contact with each other. If a large amount of noise occurs, it is difficult to accurately measure the amount of electric charges flowing in the ionization chamber 110. Therefore, since the insulation pad 150 made of a non-conductive material is interposed between the first substrate 122 and the cover member 124, it is possible to more accurately measure the amount of radon contained in the air.

For reference, one surface, that is, the upper end surface of the insulation pad 150 is coupled to the first substrate 122, and the other surface, that is, the lower end surface of the insulation pad 150 is coupled to the cover member 124. In this case, since the insulation pad 150 is made of a non-conductive material such as a double-sided tape, it is easy to combine the first substrate 122 and the cover member 124 with the insulation pad 150.

The second substrate 126 is disposed opposite to the first substrate 122 with the cover member 124 interposed therebetween, and the second substrate 126 applies the voltage, supplied from the outside, to the ionization chamber 110 through the cover member 124. In other words, the second substrate 126 is supplied with the voltage from the outside. In this case, the voltage supplied to the second substrate 126 is transferred to the cover member 124 and then applied to the ionization chamber 110.

In this case, the second substrate 126 and the cover member 124 are coupled to each other by fastening members 160 made of a conductive material.

Specifically, one or more first coupling holes 125 are formed in the cover member 124, and one or more second coupling holes 127 are also formed in the second substrate 126 at positions corresponding to the first coupling holes 141. In this case, the fastening member 160 is formed in the form of a bolt having a long body portion. Therefore, the fastening members 160 sequentially penetrate the second coupling holes 127, formed in the second substrate 126, and the first coupling holes 125, formed in the cover member 124, from below the second substrate 126.

The fastening members 160 are fixed by being finished with separately provided finishing members 161, for example, nuts or the like.

Meanwhile, referring to FIG. 5, a separate circuit pattern is formed on the second substrate 126 so that the voltage supplied from the outside is transferred to the cover member 124 through the fastening member 160. In this case, the circuit pattern to be formed on the second substrate 126 is patterned during a process of forming the second substrate 126.

That is, the fastening member 160 serves as both a mean for coupling the cover member 124 and the second substrate 126 and a mean for transferring the voltage, supplied to the second substrate 126, to the cover member 124.

In addition, the voltage to be supplied to the second substrate 126 is a bias voltage. In other words, the bias voltage supplied to the second substrate 126 is transferred to the cover member 124 through the fastening members 160 for coupling the second substrate 126 and the cover member 124. Since at least one surface of the cover member 124 is in contact with the stepped portion 114 formed in the ionization chamber 110, the voltage, which is transferred from the second substrate 126 through the fastening members 160, is applied to the ionization chamber 110.

Figure 4:
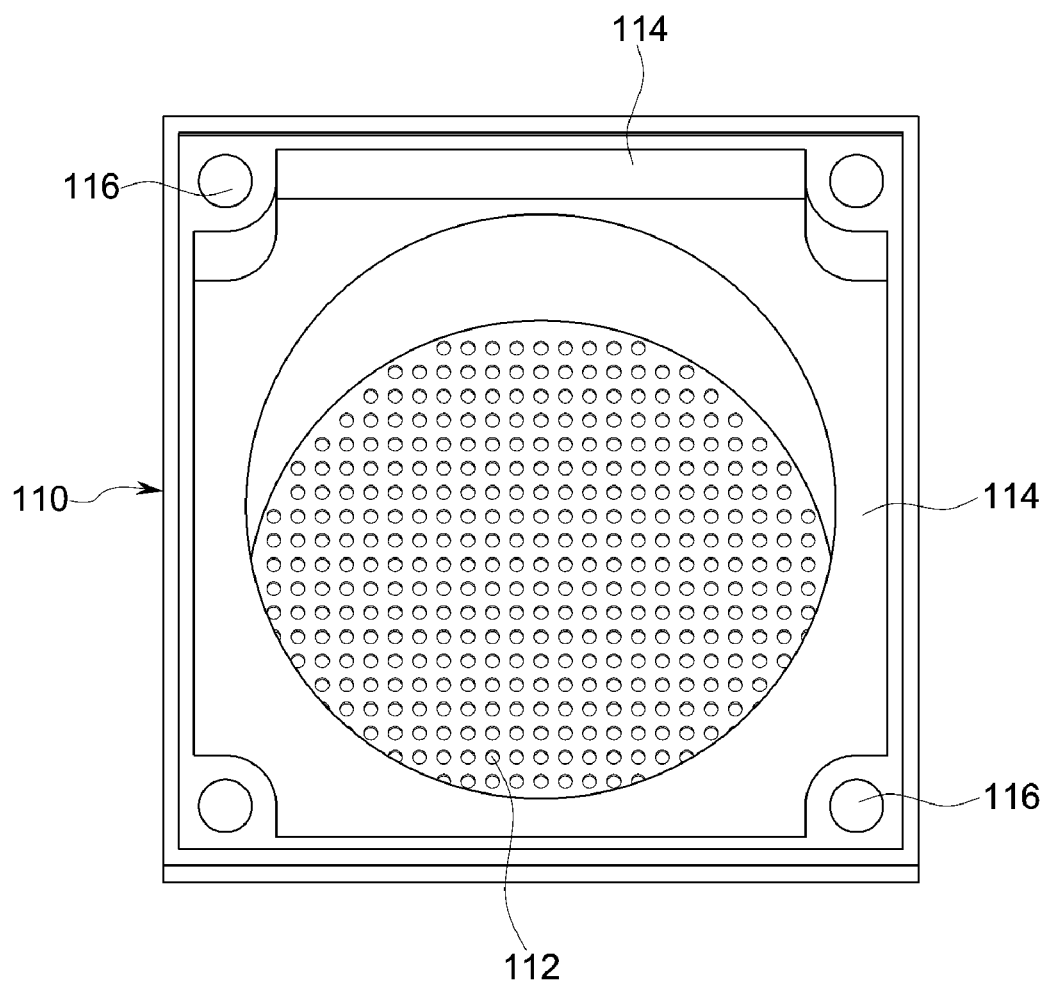
FIG. 4 is a rear view of an ionization chamber illustrated in FIGS. 1 to 3.

Referring to FIGS. 2 to 4, the probe member 130 is formed in the form of a long rod made of a conductive material, and the probe member 130 is disposed in the ionization chamber 110, that is, on the first substrate 122. The probe member 130 detects the ionized electric charge generated by the alpha (a) decay in the ionization chamber 110.

Meanwhile, in addition to the probe member 130, the switching element 140 is also disposed on the first substrate 122. In other words, the switching element 140, together with the probe member 130, is provided on the first substrate 122 and connected to the probe member 130. Therefore, the switching element 140 allows a current to flow when the electric charge is applied to the probe member 130 in a state in which a current is connected to the switching element 140.

For reference, the switching element 140 is configured as a transistor, particularly, as a field effect transistor. The field effect transistor refers to a voltage control transistor that controls a flow of electrons with different electrodes. The switching element 140 may be mounted on the first substrate 122 in various ways. For example, the switching element 140 may be mounted on the first substrate 122 by a method selected from a DIP type method, which fixes a component by forming holes in upper and lower end surfaces of a PCB, and a SMD type method that fixes a component to only one of the upper and lower end surfaces of the PCB. In this case, FIGS. 2, 3, and 5 illustrate that the switching element 140 is mounted by the SMD type method, but the present invention is not necessarily limited thereto.

The switching element 140 according to the exemplary embodiment of the present invention, together with the probe member 130, is disposed inside the ionization chamber 110 instead of outside the ionization chamber 110. In other words, the switching element 140 is installed in the ionization chamber 110, that is, on the first substrate 122 of the substrate assembly 120, and the switching element 140 is positioned in the ionization chamber 110 as the substrate assembly 120 is coupled to the ionization chamber 110.

Specifically, a radiation measuring device in the related art has a very complicated structure because two probe members are used, and the probe member is configured as an insulator in order to reduce an influence of external noise. In addition, the device in the related art uses a BNC connector in order to introduce noise into an ionization chamber, but because the BNC connector itself is high in unit price, the radiation measuring device itself is inevitably high in unit price. Further, because the transistor is positioned outside the ionization chamber, the structure of the radiation measuring device is very complicated, and external noise is inevitably increased. In contrast, in the case of the radiation measuring device 100 according to the exemplary embodiment of the present invention, the switching element 140 is provided in the ionization chamber 110, such that the switching element 140 may not be affected by external noise outside the radiation measuring device 100, the structure of the radiation measuring device may be simplified, and the internal space may be saved, as a result of which the radiation measuring device may be compactly implemented.

For reference, although not illustrated in the drawings, because the intensity of the current generated by the switching element 140 is too low, the current is amplified by using a signal amplifier (not illustrated) separately provided in the radiation measuring device 100.

Meanwhile, the intensity of the current generated by the switching element 140 varies depending on the amount of radiation contained in the air, that is, the amount of radon. For example, when the amount of radon contained in the air is large, the amount of electric charges ionized in the ionization chamber 110 is increased, and thus the number of times the current generated by the switching element 140 flows is also increased. On the contrary, when the amount of radon contained in the air is small, the amount of electric charges ionized in the ionization chamber 110 is decreased, and thus the number of times the current generated by the switching element 140 flows is also decreased. That is, the amount of radon contained in the air may be determined by counting the number of times the current generated by the switching element flows.

In addition, referring to FIGS. 2 to 4, when the second substrate 126 is coupled to the cover member 124 by the fastening member 160, the second substrate 126 may be coupled to the cover member 124 at a predetermined interval. If the second substrate 126 and the cover member 124 are completely in close contact with each other, electrical noise is generated because both the second substrate 126 and the cover member 124 are made of conductive materials, and as a result, reliability of measurement results may deteriorate.

Meanwhile, the second substrate 126 and the switching element 140 mounted on the first substrate 122 are electrically connected with connecting cables 142. In this case, as illustrated in FIGS. 2 and 3, the connecting cables 142 penetrate through holes 141 formed in the cover member 124 and are connected to the second substrate 126. For reference, the connecting cable 142 is connected from the first substrate 122 to the second substrate 126 by, but not necessarily limited to, a method such as soldering, or various publicly known methods may be used to connect the connecting cable, that is, an electric wire to a PCB.

Figure 6:
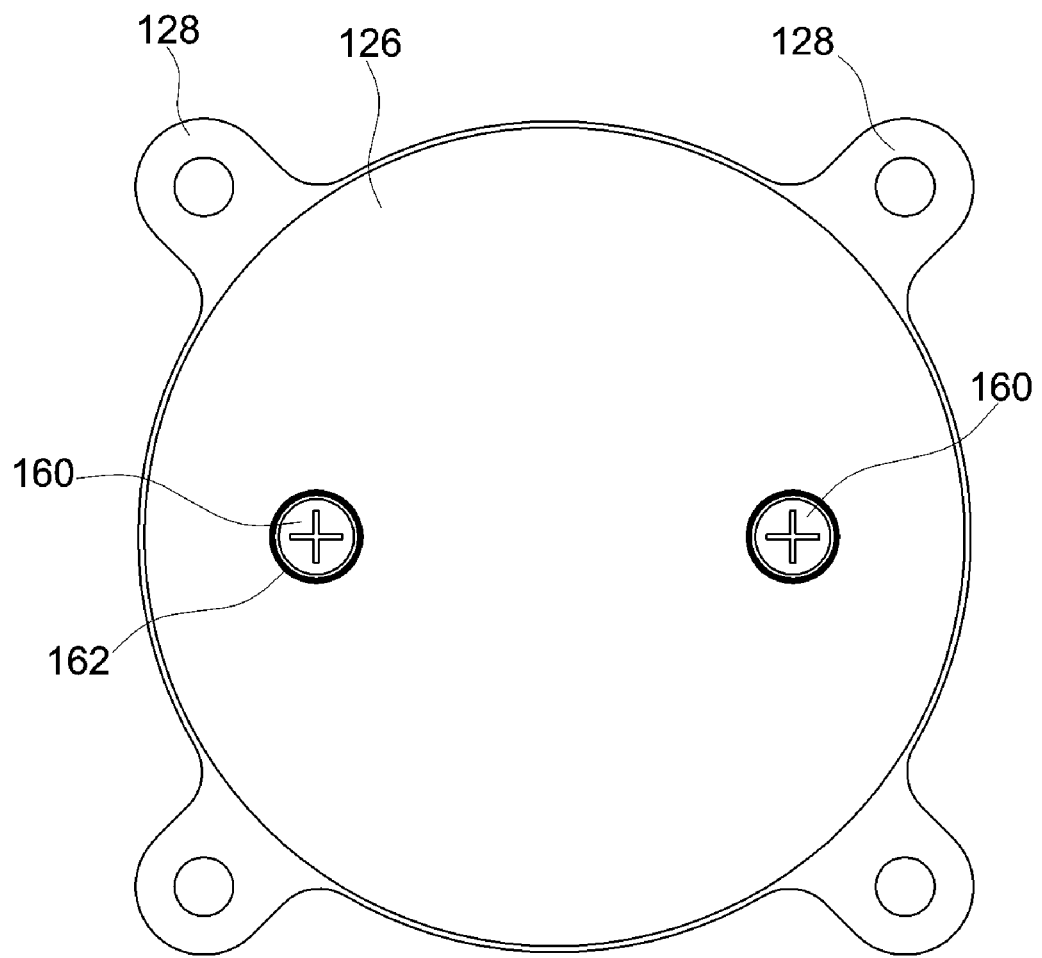
FIG. 6 is a rear view of a second substrate illustrated in FIG. 5.

In addition, referring to FIG. 6, circuit patterns 162 are formed on the second substrate 126 so that the voltage supplied from the outside is transferred to the cover member 124 through the fastening member 160. In other words, the circuit pattern 162, which is formed by patterning raw stone substances for the PCB, is formed on a portion of the second substrate 126 to which the fastening member 160 is coupled. When the fastening member 160 penetrates the second coupling hole 127 and the first coupling hole 125 and the cover member 124 and the second substrate 126 are fastened, the voltage, supplied to the second substrate 126, is transferred to the cover member 124. For reference, the voltage, which is transferred to the cover member 124 as described above, is applied to the ionization chamber 110 through the cover member 124 so that an electric field may be formed in the ionization chamber 110. Meanwhile, electric/electronic components for converting the currents, generated by the probe member 130 and the switching element 140, into meaningful signals for measuring radiation, electric/electronic components for transmitting the signals to the outside, and electric/electronic components for receiving voltages from the outside are mounted on the second substrate 126. However, these electric/electronic components are omitted from FIG. 6.

In addition, referring to FIGS. 1 to 3, the radiation measuring device 100 according to the exemplary embodiment of the present invention further includes a base member 170.

In the state in which the ionization chamber 110 and the substrate assembly 120 are coupled to each other, the base member 170 is coupled to the lower end of the ionization chamber 110, such that the radiation measuring device 100 is provided as a single module.

Specifically, coupling portions 116 are formed on the stepped portion 114 of the ionization chamber 110, and coupling portions 172 are also formed on the base member 170. In addition, coupling portions 128 are also formed on the second substrate 126 of the substrate assembly 120. First, the coupling portions 128 formed on the second substrate 126 of the substrate assembly 120 are coupled to the coupling portions 116 of the ionization chamber 110. In this case, although not illustrated in the drawings, coupling members 180 such as bolts may be used to couple the coupling portions 116 and 128. Next, in the state in which the substrate assembly 120 is coupled to the ionization chamber 110, the coupling portions 116 formed at the lower end of the ionization chamber 110 are coupled to the coupling portions 172 of the base member 170. In other words, the coupling members 180 are inserted and fastened at the lower end of the base member 170, such that the base member 170, the ionization chamber 110, and the substrate assembly 120 including the first substrate 122 mounted with the probe member 130 and the switching element 140, the cover member 124, and the second substrate 126 are combined with one another.

Therefore, since the base member 170, the ionization chamber 110, and the substrate assembly 120 mounted with the probe member 130 and the switching element 140 are configured as a single module, the radiation measuring device 100 may be more conveniently used. In addition, the circuit patterns, which allow the voltage, supplied from the outside, to be transferred to the cover member 124, are formed at the lower end of the second substrate 126 of the substrate assembly 120, and the base member 170 may protect the second substrate 126.

Meanwhile, although not illustrated in the drawings, a power source unit (not illustrated) for supplying the voltage or a display (not illustrated) may be connected to the second substrate 126. To this end, a wire extension portion (not illustrated), from which a wire is extended from the second substrate 126, may be formed on one surface of the base member 170. Of course, as illustrated in FIGS. 2 and 3, since the base member 170 has a space therein, the wire extended from the second substrate 126 may be positioned in the base member 170 and connected to other components.

Hereinafter, an operating process of the radiation measuring device 100 according to the exemplary embodiment of the present invention will be briefly described with reference to FIGS. 1 to 6.

Outside air is introduced into the ionization chamber through the air inlet holes 112 formed at one side of the ionization chamber 110.

Then, a voltage is applied to the ionization chamber 110, and the outside air introduced into the ionization chamber 110 is ionized by the voltage applied to the ionization chamber 110.

For reference, the probe member 130 detects electric charges in the ionization chamber 110.

In this case, the voltage applied to the ionization chamber 110 is the voltage which is supplied from the second substrate 126 of the substrate assembly 120 and transmitted to the cover member 124. Since the cover member 124 is coupled to and in contact with the stepped portion 114 of the ionization chamber 110, the voltage transferred to the cover member 124 is applied to the ionization chamber 110.

Then, the switching element 140 allows the current to flow when the ionized electric charge is transferred in the state in which the current is connected to the switching element 140.

In this case, the amount of radon contained in the air is measured by transferring the current and measuring the amount of transferred current.

For reference, because the intensity of the current flowing by the switching element 140 is low, the current is amplified by a separately provided signal amplifier (not illustrated) and then transferred to the outside.

For example, the amount of radioactive substances, that is, radon contained in the air is increased as the number of times the measured current flows is increased, and the amount of radioactive substances, that is, radon contained in the air is decreased as the number of times the measured current flows is decreased.

While the exemplary embodiments of the present invention have been described above with reference to particular contents such as specific constituent elements, the limited exemplary embodiments, and the drawings, but the exemplary embodiments are provided merely for the purpose of helping understand the present invention overall, and the present invention is not limited to the exemplary embodiment, and may be variously modified and altered from the disclosure by those skilled in the art to which the present invention pertains. Accordingly, the spirit of the present invention should not be limited to the described exemplary embodiment, and all of the equivalents or equivalent modifications of the claims as well as the appended claims belong to the scope of the spirit of the present invention.

INDUSTRIAL APPLICABILITY

The present invention may be used to measure, in real time, radioactive substances, for example, radon contained in indoor air.

The invention claimed is:

1. A radiation measuring device comprising:
   an ionization chamber configured to be supplied with a voltage and to form a space for ionizing air introduced into the ionization chamber;
   a substrate assembly coupled to the ionization chamber and for transferring the voltage supplied from outside to the ionization chamber;
   a probe member provided in the ionization chamber and configured to detect an electric charge in the ionization chamber; and
   a switching element connected to the probe member and configured to allow a current to flow when the electric charge is applied to the probe member,
   wherein the switching element is disposed in the ionization chamber and mounted on the substrate assembly.

2. The radiation measuring device of claim 1, wherein the substrate assembly comprises:
   a first substrate disposed in the ionization chamber and having the probe member mounted thereon; and
   a cover member configured to support the first substrate and coupled to the ionization chamber.

3. The radiation measuring device of claim 2, wherein at least a part of the cover member is made of a conductive material, and the part made of the conductive material is in contact with the ionization chamber so as to transfer the voltage supplied from outside to the ionization chamber.

4. The radiation measuring device of claim 3, wherein the ionization chamber has a stepped portion therein, and the cover member is disposed such that an edge of one surface of the cover member is in contact with the stepped portion.

5. The radiation measuring device of claim 2, wherein an insulation pad is interposed between the first substrate and the cover member.

6. The radiation measuring device of claim 2,
wherein the substrate assembly further comprises a second substrate disposed opposite to the first substrate with the cover member interposed therebetween, and the second substrate applies the voltage supplied from outside to the ionization chamber through the cover member.

7. The radiation measuring device of claim 6, wherein the switching element further comprises a connecting cable mounted on the first substrate in the ionization chamber, and the connecting cable electrically connects the second substrate and the switching element mounted on the first substrate.

8. The radiation measuring device of claim 7, wherein at least one through hole is formed in the cover member, one end of the connecting cable is connected to the first substrate, and the other end of the connecting cable penetrates the through hole and is connected to the second substrate.

9. The radiation measuring device of claim 6, wherein the cover member and the second substrate are coupled to each other by a conductive fastening member, and a circuit pattern, which transfers the voltage supplied from outside to the cover member through the fastening member, is formed on the second substrate.

* * * * *